US012748406B2

(12) United States Patent
Bouchard et al.

(10) Patent No.: US 12,748,406 B2
(45) Date of Patent: Sep. 29, 2026

(54) ROBOTIC WORKFLOW RECIPE

(71) Applicant: FLEXXBOTICS, INC., Boston, MA (US)

(72) Inventors: Tyler M. Bouchard, Boston, MA (US); Tyler Modelski, Woburn, MA (US)

(73) Assignee: Flexxbotics, Inc., Boston, MA (US)

( * ) Notice: Subject to any disclaimer, the term of this patent is extended or adjusted under 35 U.S.C. 154(b) by 488 days.

(21) Appl. No.: 18/133,690

(22) Filed: Apr. 12, 2023

(65) Prior Publication Data

US 2024/0111275 A1 Apr. 4, 2024

Related U.S. Application Data

(60) Provisional application No. 63/330,176, filed on Apr. 12, 2022.

(51) Int. Cl.
*G05B 19/418* (2006.01)

(52) U.S. Cl.
CPC .................. *G05B 19/41865* (2013.01); *G05B 2219/31443* (2013.01); *G05B 2219/33099* (2013.01); *G05B 2219/39001* (2013.01)

(58) Field of Classification Search
None
See application file for complete search history.

(56) References Cited

U.S. PATENT DOCUMENTS

| | | | | |
|---|---|---|---|---|
| 5,413,454 | A | 5/1995 | Movsesian | |
| 6,463,360 | B1 | 10/2002 | Terada et al. | |
| 7,403,835 | B2 * | 7/2008 | Sandner | B25J 9/1671 901/3 |
| 9,599,990 | B2 | 3/2017 | Halloran et al. | |
| 10,052,763 | B1 | 8/2018 | Nusser et al. | |
| 10,475,240 | B2 * | 11/2019 | Evans | B25J 9/1671 |
| 12,124,240 | B1 * | 10/2024 | Ghare | G05B 19/4155 |
| 12,420,408 | B1 * | 9/2025 | Nikolovska | B25J 13/08 |

(Continued)

FOREIGN PATENT DOCUMENTS

| | | | |
|---|---|---|---|
| EP | 1749249 | A1 | 2/2007 |
| JP | 2021086232 | A | 6/2021 |

OTHER PUBLICATIONS

International Search Report, PCT/US2023/018288, Jul. 26, 2023, pp. 1-3.

(Continued)

*Primary Examiner* — Jason Lin
(74) *Attorney, Agent, or Firm* — Armis IP Law, LLC

(57) ABSTRACT

A mesh network portal provides a graphical user interface (GUI) for invocation and management of a plurality of robotic workcells, such that each workcell includes a robot and associated peripherals for performing a job. The job fulfills a robotic task such as generating a part or other sequence of robotic instructions for a discrete, quantifiable work product. The portal is in network communication with a respective hub at a plurality of workcells, and maintains a set of recipes corresponding to the jobs selectable for each of the plurality of robots in the workcells. The GUI allows selection of a workcell, identifies the recipes available for the workcell based on the robot and peripherals in the workcell. Selection of the recipe commences execution of the recipe by the workcell. including robotic guidance elements for fulfilling a robotic task.

14 Claims, 11 Drawing Sheets

(56) References Cited

U.S. PATENT DOCUMENTS

| | | | | |
|---|---|---|---|---|
| 2007/0061041 | A1 | 3/2007 | Zweig | |
| 2011/0257786 | A1 | 10/2011 | L'Ecuyer et al. | |
| 2014/0148949 | A1* | 5/2014 | Graca | B25J 9/1671 700/248 |
| 2016/0239013 | A1* | 8/2016 | Troy | B25J 9/1664 |
| 2019/0001573 | A1* | 1/2019 | Gulbrandsen | B33Y 50/02 |
| 2019/0206003 | A1* | 7/2019 | Harris | G16H 20/40 |
| 2019/0389064 | A1 | 12/2019 | High et al. | |
| 2020/0101611 | A1* | 4/2020 | Ramanujam | G05B 17/02 |
| 2020/0117163 | A1* | 4/2020 | Imanishi | G05B 19/19 |
| 2020/0147794 | A1* | 5/2020 | Kerrick | G05B 19/4097 |
| 2020/0159648 | A1 | 5/2020 | Ghare et al. | |
| 2020/0171671 | A1 | 6/2020 | Huang et al. | |
| 2020/0230817 | A1* | 7/2020 | Han, II | B25J 9/1661 |
| 2020/0310394 | A1* | 10/2020 | Wouhaybi | H04L 67/1051 |
| 2021/0101282 | A1* | 4/2021 | Yoneyama | B25J 9/1671 |
| 2021/0138651 | A1* | 5/2021 | Mcgregor | G05B 19/41885 |
| 2021/0149655 | A1* | 5/2021 | Mathews | G06F 8/60 |
| 2022/0024047 | A1 | 1/2022 | Bouchard et al. | |
| 2023/0080565 | A1* | 3/2023 | Ogawa | B25J 9/163 700/245 |

OTHER PUBLICATIONS

Extended European Search Report, EP 23 788 885.4, Mar. 13, 2026, pp. 1-9.

* cited by examiner

ROBOTIC WORKFLOW RECIPE

RELATED APPLICATIONS

This patent application claims the benefit under 35 U.S.C. § 119(e) of U.S. Provisional Patent App. No. 63/330,176, filed Apr. 12, 2022, entitled "ROBOTIC WORKFLOW RECIPE" incorporated herein by reference in entirety.

BACKGROUND

The robotics industry has become increasingly advanced in recent decades as advances in cost and precision allows viability for an increasing number of industrial processes involving repetitive actions. Large industrial robots have been in use for heavy equipment manufacturing, and typically involve fixed position, dedicated task machines that represent substantial capital investment. More recently, smaller, general purpose utility robots have emerged, which typically have a more universal manipulation capability that can be applied to multiple industrial tasks by reconfiguring and reprogramming the robot with instructions for performing the particular industrial process. These general purpose industrial or utility robots provide greater flexibility than larger, dedicated robot, however require configuration and programming for completion of a robotic task.

SUMMARY

A mesh network portal provides a graphical user interface (GUI) for invocation and management of a plurality of robotic workcells, where each workcell includes a robot and associated peripherals for performing a job. The job fulfills a robotic task, such as generating a part, generally performing a sequence of robotic instructions for a discrete, quantifiable work product. The portal is in network communication with a respective hub at a plurality of workcells, and maintains a set of recipes corresponding to the jobs selectable for each of the plurality of robots in the workcells. The GUI allows selection of a workcell and identifies the recipes available for the workcell based on the robot and peripherals in the workcell, Once selected, a list of recipes available for the workcell is displayed. Upon selection of a recipe, for example a part to be produced, available versions of the recipe expand below the selection in a pull-down form. Selection of the version of the recipe commences execution of the recipe by the workcell, including transmitting configuration files for setting robotic parameters, instructions or program files containing the machine code for executing the robotic tasks, and instructional media such as text and video for assisting a robotic operator to fulfill the job.

Configurations herein are based, in part, on the observation that industrial robots, such as 6-axis collaborative utility robots, are often configured and invoked for completion of multiple tasks (jobs) via reconfiguration and different programs that allow the robot to fulfill the various tasks, such as fabrication of specific parts used in a larger apparatus or machine. As discussed in copending U.S. application Ser. No. 17/381,834, filed Jul. 21, 2021, entitled "MESH NETWORK OF RECONFIGURABLE ROBOTS," incorporated herein by reference, a plurality of robots interconnected by a mesh network are reconfigurable by identifying configurations and commends needed by each robot for performing a task to complete a discrete quantifiable result, for example CNC machining of a desired part or finished object.

Unfortunately, conventional approaches to configuration and invocation of collaborative industrial robots suffer from a shortcoming of manual reconfiguration and file transfers launch a new robotic program for generating a different part. Accordingly, configurations herein substantially overcome the shortcomings of conventional approaches by providing a portal in network communication with the array of robots, such as in an industrial or manufacturing facility, and launching a GUI on the portal for selecting and invoking a recipe for a job that identifies and transmits corresponding configuration commands (files), robotic programs for executing the robotic task, and relevant instructional media for assisting a human operator, collectively referred to as robotic guidance elements. The GUI maintains a status of each robot and available recipes for jobs on the robot, based on available peripherals in the workcell and robotic capabilities for fulfilling the requested job. In this manner, each workcell may be configured and reconfigured as needed with a single recipe selection for providing needed configurations, programs and support media to the workcell.

A mesh network controller includes a portal and the GUI for a plurality of collaborative utility robots disposed around an industrial environment or facility. The portal monitors and controls the utility robots for movement and redeployment around the industrial environment for engaging with industrial processes and receiving a process specific control program or instruction set for performing a utilization task required by the industrial process. Upon completion or demand, the engaged utility robot may receive a subsequent recipe for a different job and process specific instruction set for the subsequent job. In this manner, a relatively smaller number of utility robots may be disposed and redeployed around an industrial environment for tending to processes that may not require a full time deployment of a dedicated utility robot. In other words, each robot need not be configured indefinitely for only performing one specific task or job.

Configurations herein employ a so-called 6-axis robot of about 30-60 pounds, which are sufficiently portable to be transported around an industrial environment such as a factory or operation floor in order to tend to multiple processes on a rotating or periodic, on demand, basis. These robots may be referred to as collaborative robots, and the approach herein is applicable to any suitable type of industrial robot based on the type of program to be commenced and executed for fulfilling a utilization task.

In a particular configuration depicted below, an industrial environment employs the collaborative utility robots for performing various tasks simply by invoking the corresponding recipe. A network controller, or server, establishes a mesh network of beacons spaced around the industrial environment and is conversant using a mesh network protocol such as WiFi®, Bluetooth®, Thread or Zigbee®. Other suitable network mediums may also be employed for coupling the portal to a plurality of hubs and constituent robots in an industrial setting. The network controller provides for reconfigurable utility robot deployment for a plurality of industrial processes responsive to robotic control, using an array of beacons disposed around the industrial environment to provide a wireless interface to each robot and supporting machines and sensors. The hub couples to each of the beacons in the array of beacons via the mesh network, in which the hub is operable to direct a set of instruction messages for each of the utilization tasks for providing the robotic guidance elements.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example of an industrial environment includes a plurality of work cells for receiving and performing a recipe by the robot and associated sensors and/or peripherals that complement the task (job) performed by the robot.

Figure 1:
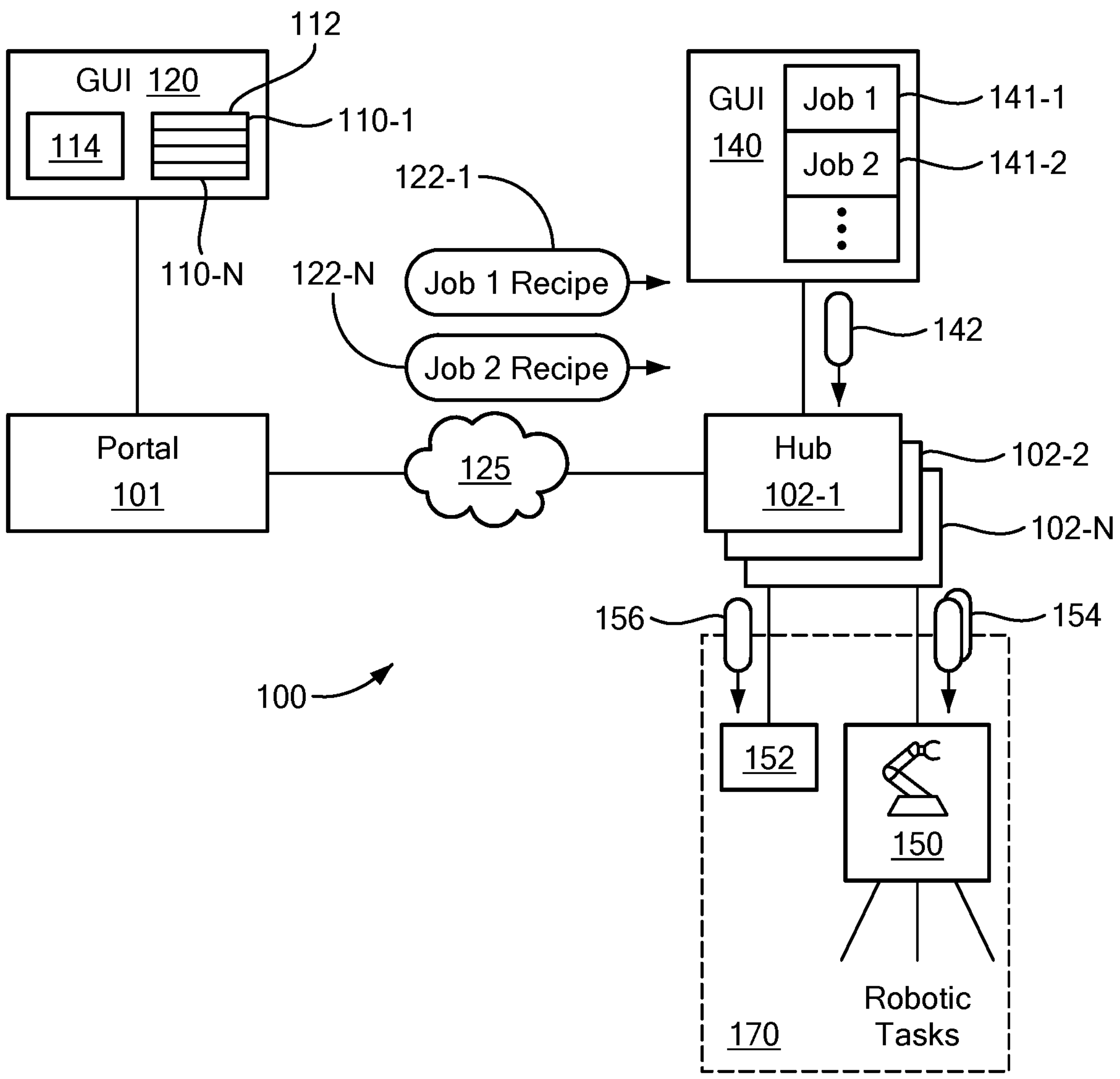
FIG. 1 is a context diagram of a collaborative robot environment suitable for use with configurations herein.

FIG. 1 is a context diagram of a collaborative robot environment suitable for use with configurations herein. Referring to FIG. 1, the portal 101 and a plurality of hubs 102-1 . . . 102-N (102 generally) are each defined by computing devices. The portal 101 renders a respective GUI (Graphical User interface) on a monitor or other rendering device. In an industrial environment, a method of deploying utility robots 150 includes identifying, via a GUI (Graphical User Interface) 120, a stored recipe 110 including robotic guidance elements for fulfilling a robotic task. The GUI 120 is invoked to deploy the identified recipe 122-1 . . . 122-N (122, generally) to a hub 102-1 . . . 102-N (102 generally) including a robot and an operator station. The transmitted recipe 122 includes a set of robotic guidance elements associated with the commencement and performance of the robotic task. In a general sense, robotic guidance elements include robot configuration files for initializing the utility robot for performing the robotic task, machine instructions for directing the robot in iterative actuation for performing the robotic task, and work instructions renderable to an operator display for identifying interactive elements to commence the robotic task. These also may include, but are not limited to work instructions, program files, digital media, process checks, monitoring tools, alerts and quality checks used in conjunction with the robotic task performed by the job. Other elements may also be included as needed by a particular robotic task. The GUI 120 also provides a recipe generator 114 for development and assimilation of the robotic guidance elements included in a recipe for a particular job or robotic task.

Continuing with the block diagram of FIG. 1, the GUI 120 receives an operator selection for a recipe 110 for a particular robotic task from a menu 112 of available tasks. The portal 101 transmits the deployed recipe 122, including associated files, for the selected robotic task to the corresponding hub 102, and the hub 102 commences the robotic task based on the robotic guidance elements in the received recipe 122. The hub 102 performs the selected job based on the deployed recipe by invoking the robot 150 and other peripherals 152 or devices under the hub, collectively referred to as a workcell 170, called for by the deployed recipe 122.

The portal 101 and a plurality of hubs 102-N connect to a mesh network 125 coupling the portal 101 to the hubs 102. The portal renders the GUI 120 for identifying the recipe, and connects to one or more hubs in communication with the robot for fulfilling the robotic task. At the hub 102, there may be a hub GUI 140 responsive to an operator selection of a plurality of jobs 141-1 . . . 141-2 (141 generally) enabled at the hub for performance by the robot 150, depending on the recipes sent by the portal. The selected job 142 defines a robotic task, which is a physical interaction between a utility robot and one or more objects such as peripherals 152 manipulated by or responsive to the utility robot 150 for fulfilling a quantifiable result from the physical interaction. In the example configuration, a task may be fabrication of milled parts. Collectively, each robot 150 and associated peripherals 152 define the workcell 170 suited for performing the robotic task defined by a particular job. Based on the selected job, the hub receives the robotic guidance elements corresponding to a recipe 122 and associates the recipe with the selected job 142 performable by one or more of the robots 150. This may include sending robotic guidance elements 154 to the robot, such as vendor specific machine instructions, to the peripherals 156 for support or testing, and some robotic guidance elements may be utilized by the hub, such as robotic configuration programs and operator guidance media, according to the recipe of the job at hand.

As an example robotic task, the collaborative robots or industrial robots responsive to the hub may be 6-axis robots, and may be associated with a hub 102 for performing tasks such as CNC (Computer Numerical Control) machining, injection molding, welding, logistics, and other suitable tasks. In the example of a CNC robot, a recipe may be defined by an individual part to be machined by a sequence of CNC instructions. In this example, each part has a corresponding recipe, which includes all the robotic guidance elements for machining the part. The corresponding job may have several revisions for variations on the part. Once the recipe is selected, the robotic guidance elements would include the set of machine instructions for directing the CNC to cut (machine) the part, such as a cutting path and depth for forming the part from a monolithic block of aluminum, for example. Also included are a configuration, including settings or initialization commands for the robot, such as cutting speeds, rotation speeds, sizing of the monolithic block to be cut, and the like. Since each workcell is often interactively staffed, a set of media including written instructions (text) and/or instructional videos for guidance are also included in the recipe. Further, as indicated in the copending application cited above, the machine instructions may include a mapping of cutting instruction to vendor-specific robot instructions, to allow the recipe to cover multiple robots of different vendors.

Figure 2:
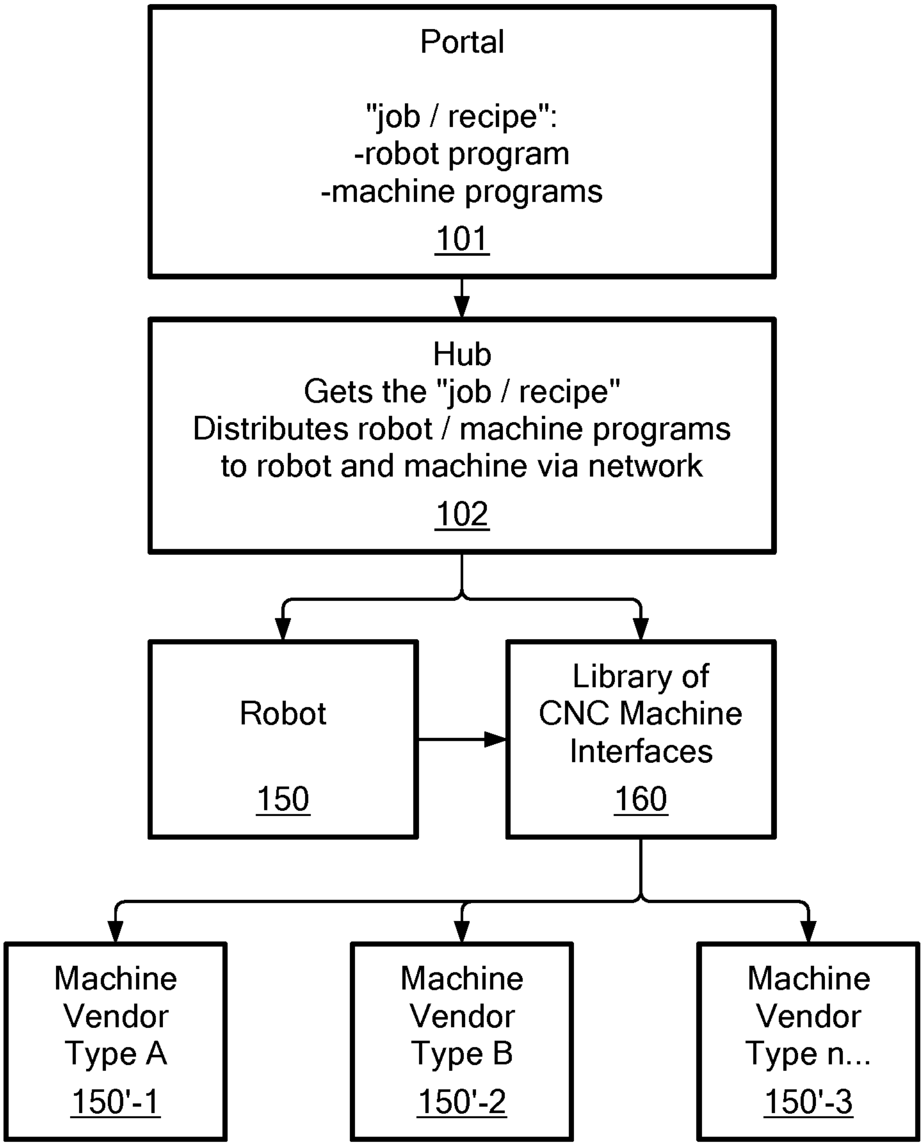
FIG. 2 is a block diagram of a workflow from the portal to the workcell of FIG. 1.

Still further, the recipe may include robotic guidance elements such as configuration files specific to a robot of a particular manufacturer. Vendor specific configuration files may be included as part of the recipe. The robot task may then be fulfilled by identifying a link to a vendor specific library, such that the vendor specific library includes robotic guidance elements specific to a robot of the respective vendor, and including a robotic guidance element from the vendor specific library in the deployed recipe. The vendor specific library provides a communications translation layer between the robot fulfilling the task and the CNC machine peripheral FIG. 2 is a block diagram of a workflow from the portal to the workcell of FIG. 1. Referring to FIGS. 1 and 2, the portal 101 is operable to communication with a plurality of hubs 102, each defining a workcell 170 of at least one robot 150 and associated peripherals 152. The workcell 170 is in communication with a library of machine interfaces 160, each suited to a vendor specific set of commands for a particular machine 150'-1 . . . 150'-3. The portal 101 transmits the recipe to the robot via the corresponding hub 102-N, where the hub in communication with the portal via a respective interface, without the need to inquire of the manufacturer or type of robot. This allows the same recipe to perform a particular task (such as machining a part) across multiple workcells 170 even though the workcells contain robots 150 of different vendors.

Figure 3:
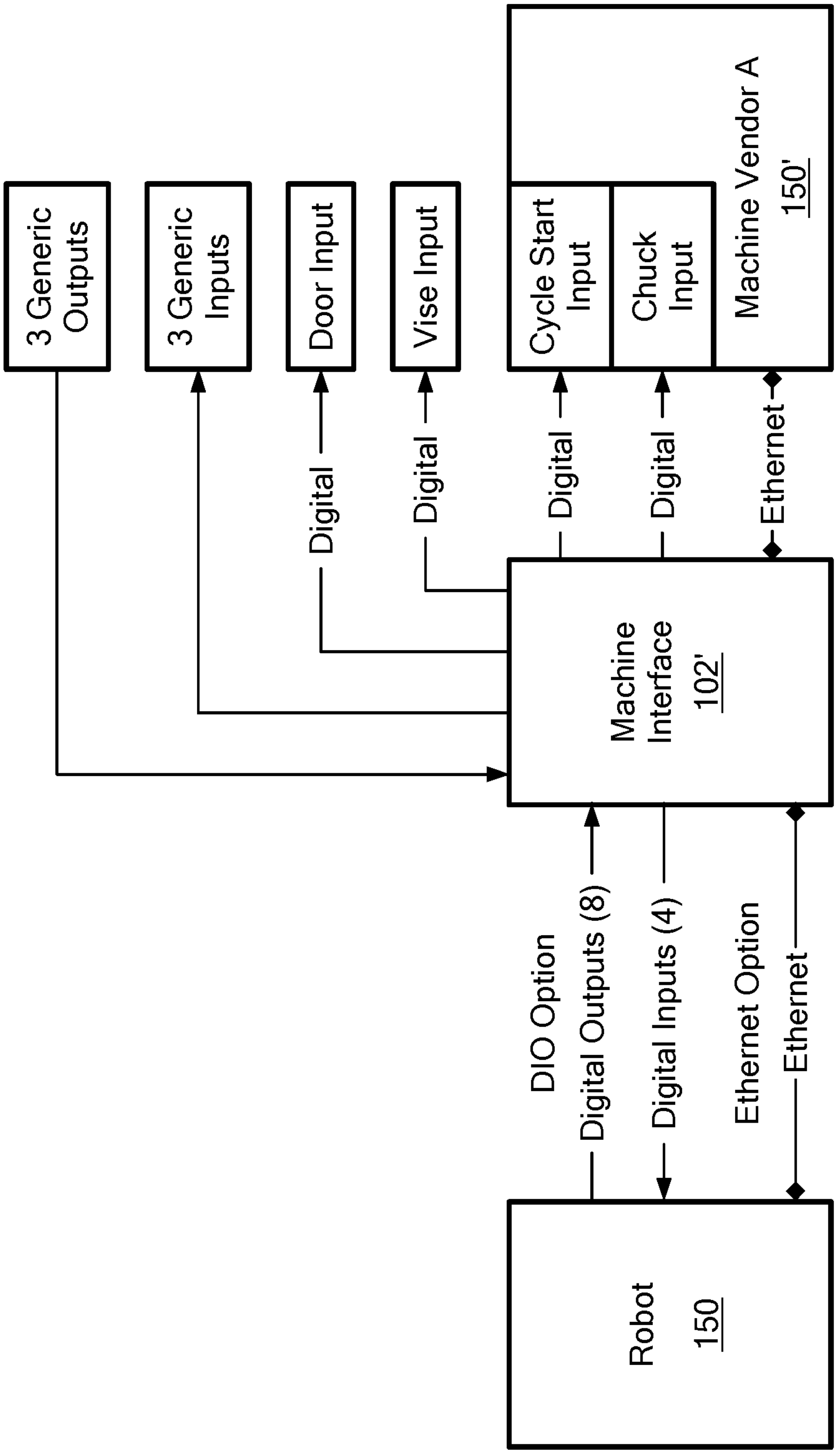
FIG. 3 shows the interfaces provided by the hub of FIG. 1.

FIG. 3 shows the interfaces provided by the hub of FIG. 1. Referring to FIGS. 1-3, the hub 102 defines a machine interface between the robot 150 and a vendor specific library or set of instructions 150'-N for vendor N. The recipe 122 is vendor agnostic in that it is centric to the job or part called for by the recipe 122, and agnostic to the vendor, since it is capable of mapping vendor specific commands or instructions based on the machine instructions included in the robotic guidance elements obtained from the portal as part of the recipe.

Figure 4A:
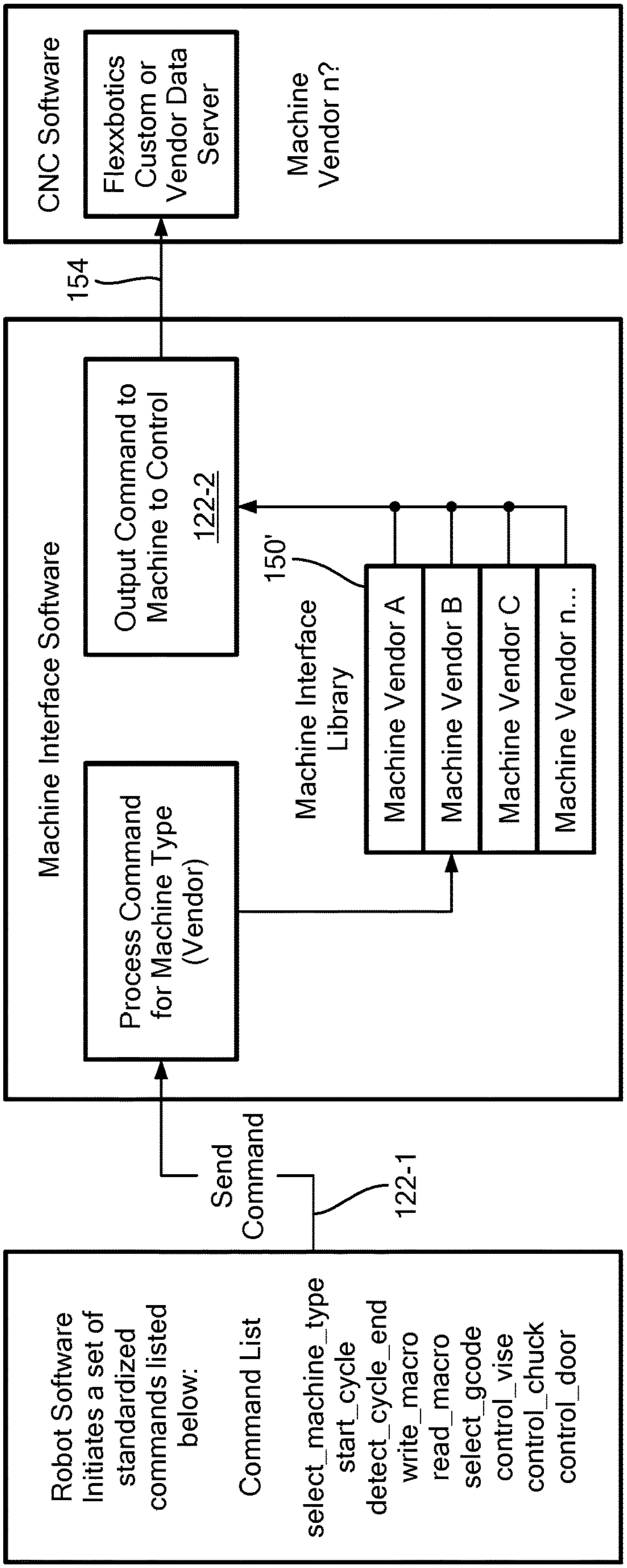
FIGS. 4A and 4B show recipe implementation of robotic guidance elements via the hub of FIGS. 1 and 2 based on the recipe.
Figure 4B:
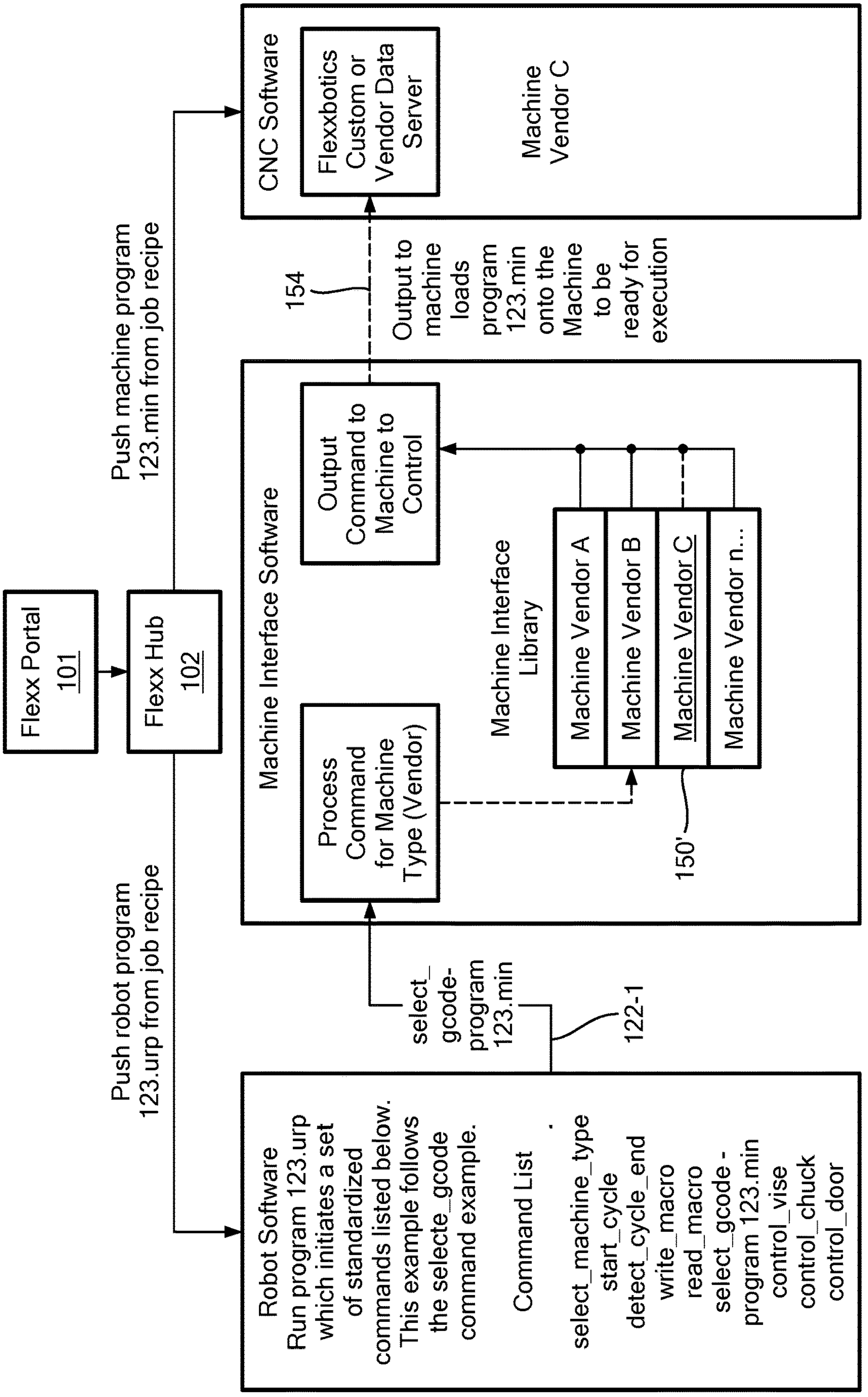

FIGS. 4A and 4B show recipe implementation of robotic guidance elements via the hub of FIGS. 1 and 2 based on the recipe. Referring to FIGS. 4A and 4B, and continuing to refer to FIGS. 1-3, FIG. 4A shows a general command flow of machine instructions (vendor agnostic) from a recipe 122 to the CNC software driving the CNC actuations in the robot, typically a cutting path. Robot software defined in the recipe includes the machine instructions. From the machine instructions, a command 122-1 is received by the interface and mapped to a vendor specific guidance element 154 depending on the vendor of the robot 150 in the workcell 170. FIG. 4B shows an example of control from the recipe 122 in the context of FIG. 1. A recipe 122 from the portal 101 is received at the hub 102 for a workcell 170. Machine instructions in file 123, urp received by the hub 102 are applicable to a number of vendors. A generic command list resolves this to a command 122-1, that is mapped to the interface libraries 150' where it is resolved to machine vendor C, based on the manufacturer of the robot 150 in the workcell, and robotic guidance element 154 is sent corresponding to a robot of vendor C.

Figure 5:
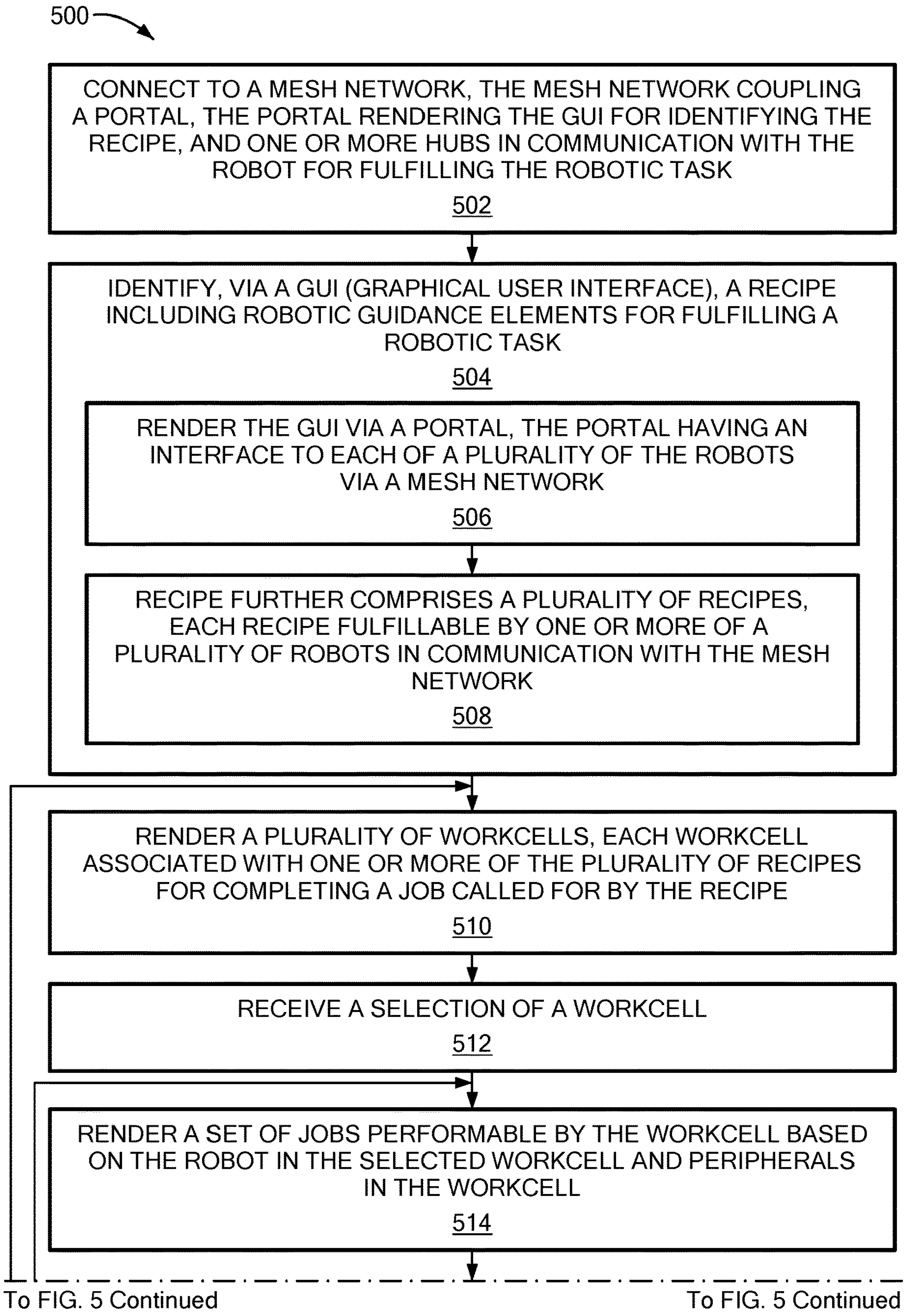
FIG. 5 shows a flowchart of recipe invocation on the network of FIGS. 1 and 2.
Figure 5:
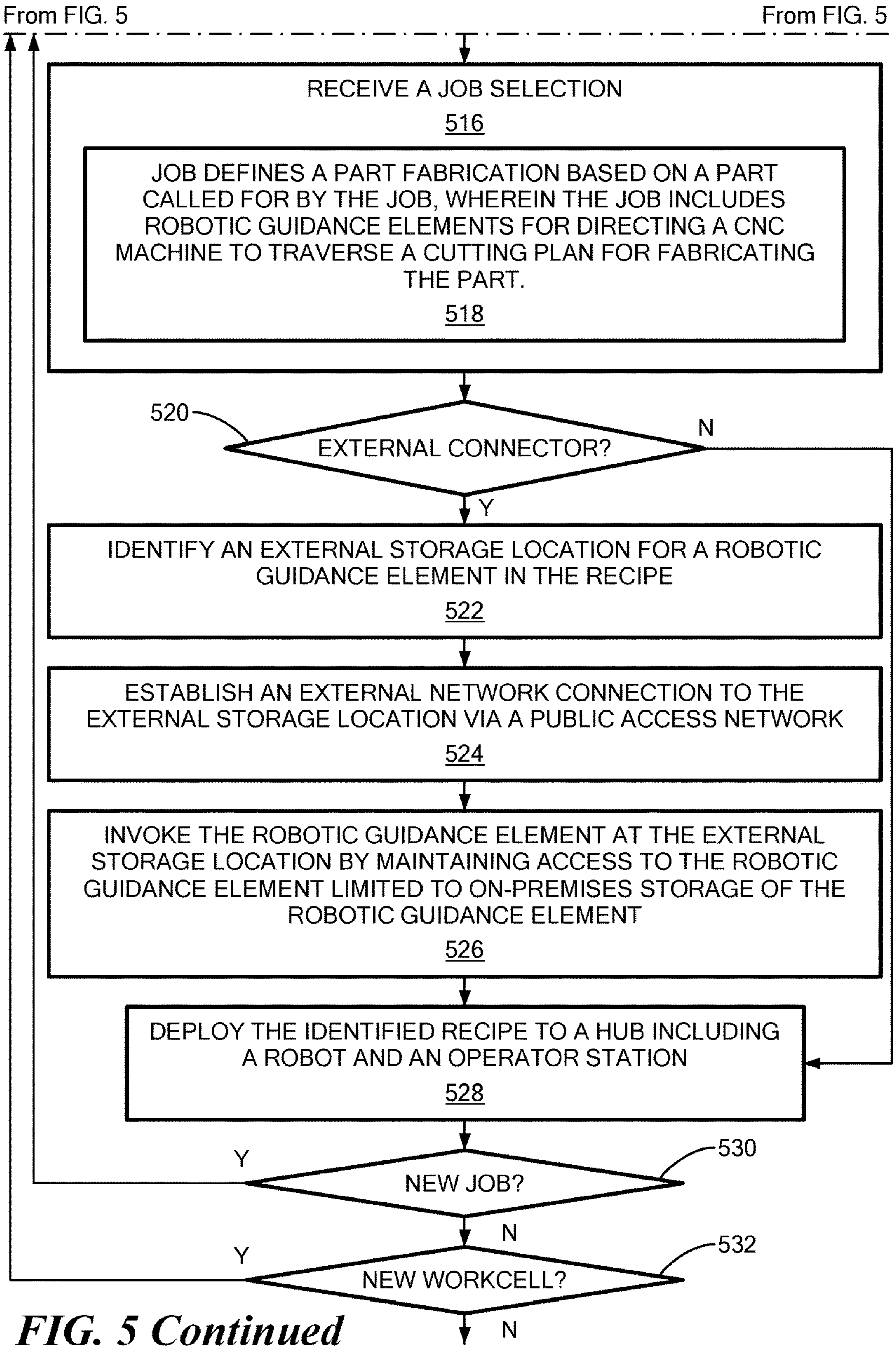

FIG. 5 shows a flowchart 500 of recipe invocation on the network of FIGS. 1 and 2 for deploying utility robots in an industrial environment. Referring to FIGS. 1-5, a user directs the portal 101 to connect to the mesh network 125, as depicted at step 502. The mesh network 125 couples the portal 101 rendering the GUI for identifying the recipe with one or more hubs 102 in communication with the robot for fulfilling a robotic task. Using the GUI, a user identifies a recipe including robotic guidance elements for fulfilling a robotic task, as shown at step 504 . . . . The portal 101 has an interface to each of a plurality of the robots via the hub 102 connected via the mesh network 125, as depicted at step 506. In the industrial environment, a plurality of recipes are available via the GUI, such that each recipe 122 is fulfillable by one or more of a plurality of robots in communication with the mesh network, as disclosed at step 508.

The GUI renders a plurality of workcells, depicted further below in FIG. 6, such that each workcell 170 is associated with one or more of the plurality of recipes for completing a job called for by the recipe. 122, as shown at step 510. The portal 101 receives a selection of a workcell via the GUI, as depicted at step 512. The GUI renders a set of jobs performable by the workcell 170 based on the robot 150 in the selected workcell and available peripherals 152 in the workcell, as depicted at step 514. Each workcell includes supporting peripherals that may be employed for the selected job, and typically includes an operator screen where instructional media of the recipe may also be available. The portal 101 receives a job selection, as shown at step 516, and invokes the robot 150 in the workcell 170 for fulfilling the selected job by transmitting robotic guidance elements 154 including configuration files and instruction files via the hub 102 to the robot 150. In the example configuration, demonstrating CNC product manufacturing, the job defines a part fabrication based on a part called for by the job, wherein the job includes robotic guidance elements for directing a CNC machine to traverse a cutting plan for fabricating the part, as depicted at step 518.

In some settings, the robotic guidance elements include machine instructions (files), drivers or work instructions of a proprietary nature. In such instances, it is preferable to access the elements via an external connector, which provides security by ensuring the external element remains on premises of the mesh network. Depending on customer and security requirements, files and instructions may also be stored via internal databases such as ERP (Enterprise Resource Planning) and MES (Manufacturing Execution System) systems. In these cases, connectors are used to retrieve the correct file revisions to be associated with the corresponding recipe. This is achieved through a library of external business connectors for vendor specific systems. Other security and encryption may also apply to such external connectors. Accordingly, a check is performed, at step 520, to determine if external connectors are included with the selected recipe 122. If so, the portal 101 identifies an external storage location for a robotic guidance element in the recipe, as depicted at step 522, and establishes an external network connection to the external storage location via a public access network, as shown at step 524. This may involve a secure Internet connection, or other suitable public or private network protection. Invocation of the recipe will commence the job using the robotic guidance element (files, commands, drivers, etc.) at the external storage location by maintaining access to the robotic guidance element limited to on-premises storage of the robotic guidance element, as depicted at step 526.

The portal then deploys the identified recipe 122 to a hub 102 if the corresponding workcell 170 includes at least a robot 150 and an operator station for completing the job corresponding to the selected recipe. A check is performed, at step 530, to determine if a new job is to be invoked for the workcell, and a further check at step 532 for selecting a new workcell.

Figure 6:
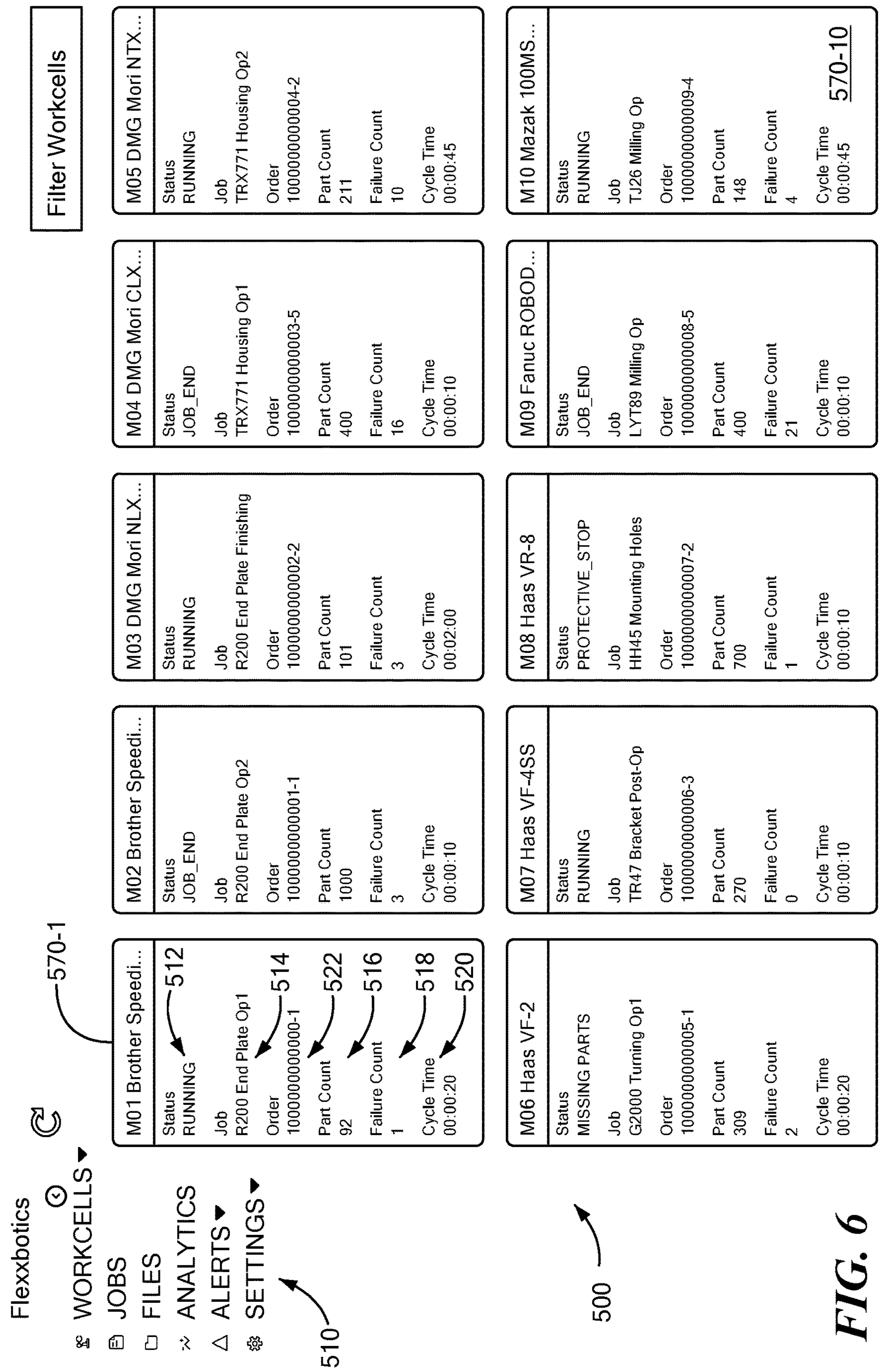
FIG. 6 shows a GUI for invoking a workcell as described in FIG. 5.

FIG. 6 shows a GUI 500 for invoking a workcell 170 as described in FIGS. 1-5. Referring to FIGS. 1-6, the portal 101 renders the GUI 500 including a top level menu 510 and a selection of icons 570-1 . . . 570-10 (570 generally) corresponding to workcells 170 available in the mesh network 125. In each icon 570, for the respective workcell 170, a status 512 shows current activity. A job 514 indicates a selected recipe 122 for making a part, and a part count 516, failure count 518, and time information 520 are shown. A corresponding order 522 is also shown.

Figure 7:
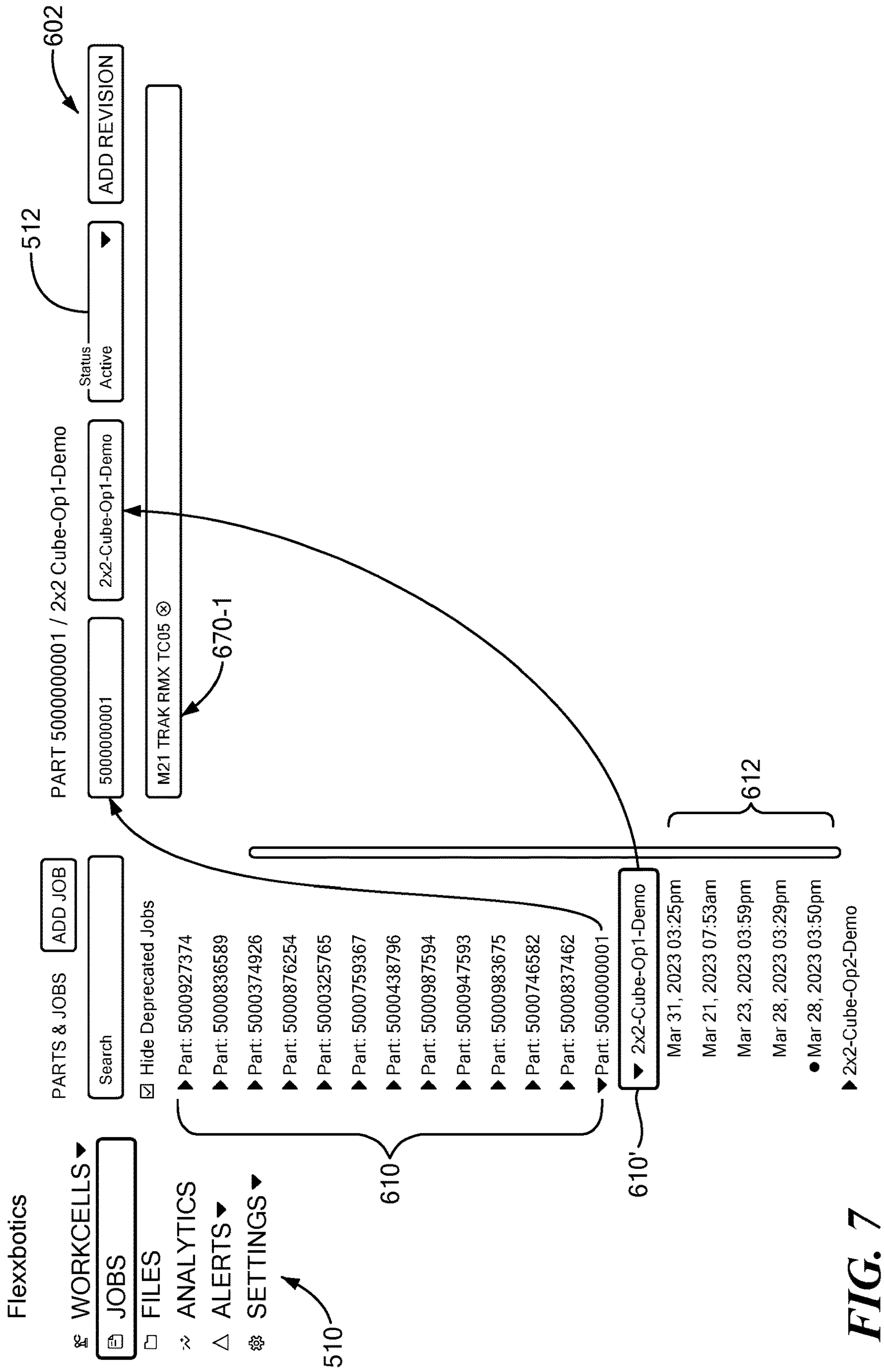
FIG. 7 shows selection of a recipe defining a job for a part number as in FIG. 5.

FIG. 7 shows selection of a recipe defining a job for a part number as in FIGS. 5-6. Upon selection of a workcell 570, the jobs including a list 610 of parts available to be generated by the corresponding workcell 170 is shown.

Upon selection 610', a version history 612 for the part is shown. The versions represent a fine tuning of the job/recipe 122, and there may only be a single version of the job selected 610.' Once selected, a status line 602 reiterates the part number, job selected 610,' and status 512, along with the selected workcell 670-1.

Figure 8:
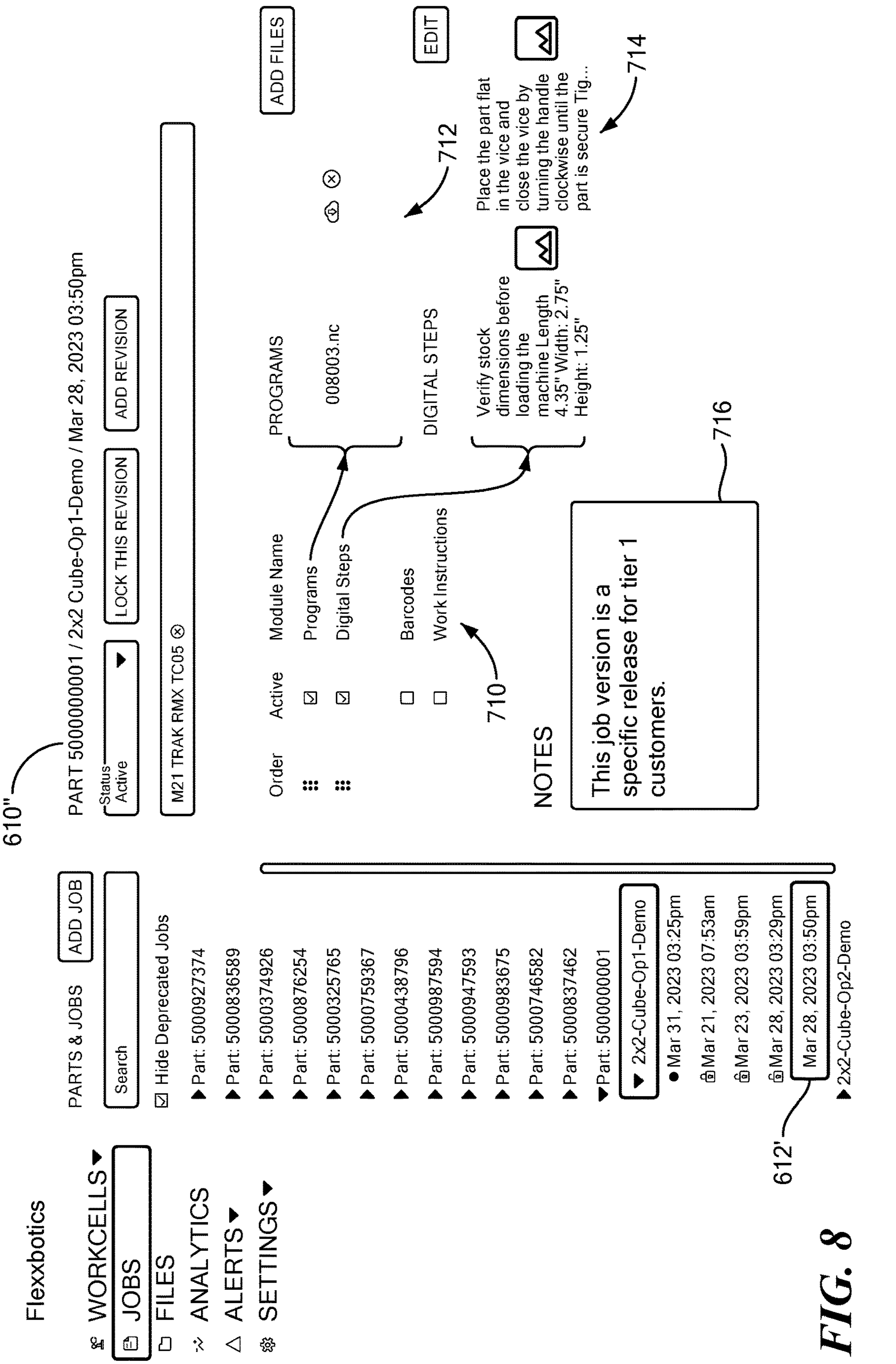
FIG. 8 shows commencement of a version of the job as in FIG. 7.
Figure 9:
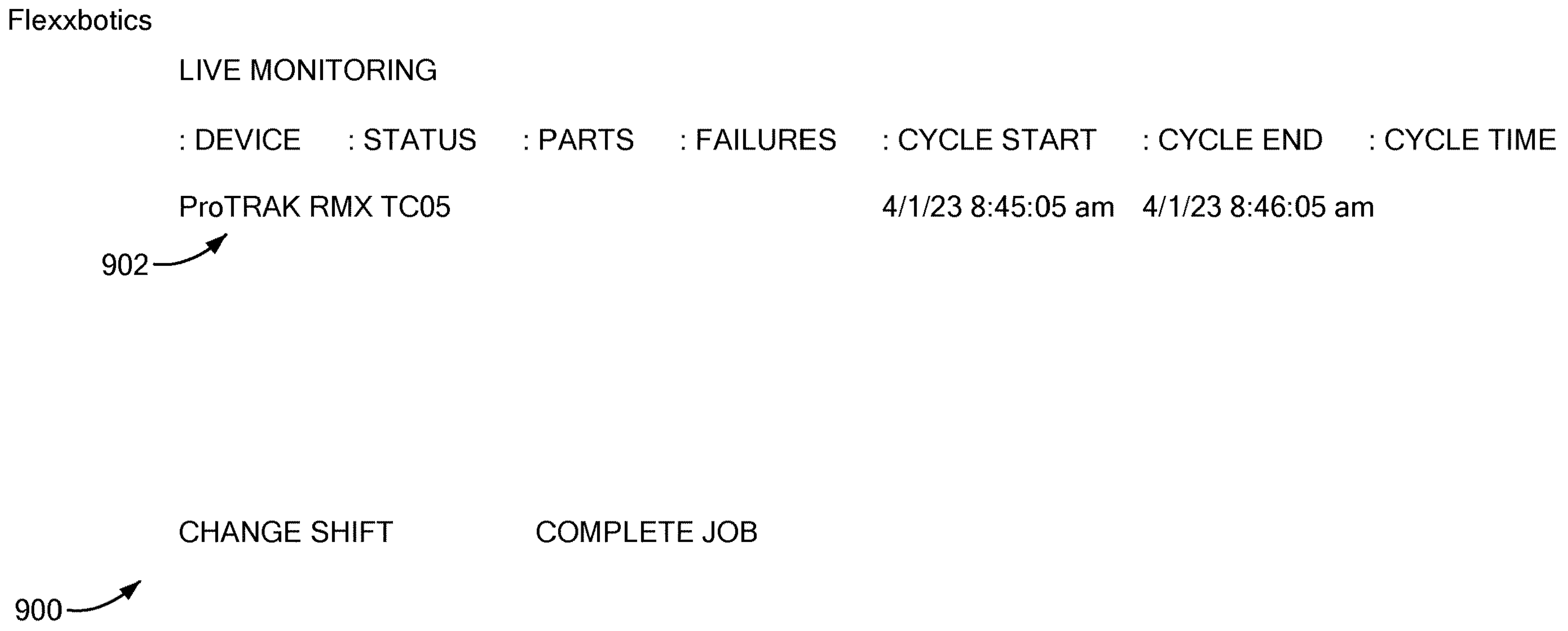
FIG. 9 shows a status screen for as plurality of jobs invoked via the portal as in FIGS. 1 and 2.

FIG. 8 shows commencement of a version of the job as in FIG. 7. For the selected version 612,' recipe details are rendered, including modules 710, program files 712, digital steps 714 or instructional media, and notes 716. FIG. 9 shows a status screen for as plurality of jobs invoked via the portal as in FIGS. 1 and 2. In FIG. 9, a robot status screen 900 shows, for a selected robot 902, quantitative metrics.

The example configurations depict robots for CNC machining from recipes 122 for individual fabricated parts. Other contexts and robotic uses may be invoked for any robotic task attributable to an object or result from a constituent recipe. In the CNC examples above, the GUI identifies a recipe 122 corresponding to a task for fabricating a part by a robot in a workcell. The corresponding hub 101 receives, based on the recipe, machine instructions for directing a CNC cutting head for fabricating the part. This includes configuring, based on the recipe, the robot for CNC machining of the part, and executing the machine instructions on the robot in response to selection of the recipe. The recipe 122 includes all the robotic guidance elements 154, including the machine instructions, for guiding the robot. In the example configuration, the recipe includes machine instructions in G code for CNC machining, however any suitable machine instructions may be called for by the recipe.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of deploying utility robots in an industrial environment, comprising:

identifying, via a GUI (Graphical User Interface), a recipe including robotic guidance elements for fulfilling a robotic task, the robotic guidance elements including:

robot configuration files for initializing each utility robot from a plurality of utility robots for performing the robotic task, machine instructions for directing the robot in iterative actuation for performing the robotic task, and work instructions renderable to an operator display for identifying interactive elements to commence the robotic task;

deploying the identified recipe to a hub, the hub corresponding to a workcell including the utility robot and an operator station, determining that the recipe references a respective robotic guidance element in an external enterprise business system;

referencing the vendor specific library from the recipe for identifying an external connector for providing remote access to the external enterprise business system;

accessing the respective robotic guidance element via the identified external connector; and commencing, based on the robotic guidance elements in the deployed recipe, the robotic task.

2. The method of claim 1, further comprising:

receiving an operator selection for a particular robotic task;

identifying the deployed recipe for the selected robotic task; and performing the selected robotic task based on the deployed recipe.

3. The method of claim 1 further comprising:

connecting to a mesh network, the mesh network coupling a portal, the portal rendering the GUI for identifying the recipe, and one or more hubs in communication with the robot for fulfilling the robotic task.

4. The method of claim 1 further comprising:

rendering the GUI via a portal, the portal having an interface to each of a plurality of the robots via a mesh network, and transmitting the recipe to the robot via a hub, the hub in communication with the portal via a respective interface.

5. The method of claim 4 wherein the recipe further comprises a plurality of recipes, each recipe fulfillable by one or more of a plurality of robots in communication with the mesh network, further comprising:

rendering a plurality of workcells, each workcell associated with one or more of the plurality of recipes for completing a job called for by the recipe.

6. The method of claim 4 further comprising:

receiving a selection of a workcell;

rendering a set of jobs performable by the workcell based on the robot in the selected workcell and zero or more peripherals in the workcell;

receiving a job selection; and invoking the robot in the workcell for fulfilling the selected job by transmitting configuration files and instruction files via the hub to the robot.

7. The method of claim 4 wherein the job defines a part fabrication based on a part called for by the job, wherein the job includes robotic guidance elements for directing a CNC machine to traverse a cutting plan for fabricating the part.

8. The method of claim 4 further comprising:

identifying an external storage location for a robotic guidance element in the recipe;

establishing an external network connection to the external storage location via a public access network; and commencing the job using the robotic guidance element at the external storage location by maintaining access to the robotic guidance element limited to on-premises storage of the robotic guidance element.

9. The method of claim 1 further comprising identifying a recipe corresponding to a task for fabricating a part;

receiving, based on the recipe, machine instructions for directing a CNC cutting head for fabricating the part;

configuring, based on the recipe, the robot for CNC machining of the part; and executing the machine instructions on the robot in response to selection of the recipe.

10. The method of claim 1 wherein the recipe includes machine instructions in G code for CNC machining.

11. The method of claim 1 wherein the robotic task is a physical interaction between a utility robot and one or more objects manipulated by the utility robot for fulfilling an quantifiable result from the physical interaction.

12. The method of claim 1 further comprising:

receiving, from a GUI, the robotic guidance elements corresponding to a recipe; and associating the recipe with a job performable by one or more of the robots.

13. The method of claim 1, further comprising:

identifying a link to a vendor specific library, the vendor specific library including robotic guidance elements specific to a robot of the respective vendor;

including a robotic guidance element from the vendor specific library in the deployed recipe; and accessing the vendor specific library via the hub, the hub in communication with a plurality of vendor specific libraries for a plurality of respective vendors.

14. A mesh network portal for deploying utility robots in an industrial environment, comprising:

a GUI (Graphical User Interface) configured to identify a recipe including robotic guidance elements for fulfilling a robotic task, the robotic guidance elements including:

robot configuration files for initializing each utility robot from a plurality of utility robots for performing the robotic task, machine instructions for directing the robot in iterative actuation for performing the robotic task; and work instructions renderable to an operator display for identifying interactive elements to commence the robotic task;

an interface to a hub for deploying the identified recipe to the hub, the hub defining a workcell including the utility robot and an operator station, the GUI is further configured to determine that the recipe references a respective robotic guidance element in an external enterprise business system;

the GUI is further configured to referencing the vendor specific library from the recipe for identifying an external connector for providing remote access to the external enterprise business system;

the GUI is further configured to accessing the respective robotic guidance element via the identified external connector; and wherein the robotic task is commenced based on the deployed recipe.

* * * * *